April 15, 1958  L. J. BIRO  2,830,452
CLINICAL THERMOGRAPH

Filed July 13, 1953  2 Sheets-Sheet 1

INVENTOR,
LADISLAO JOSE BIRO

BY
ATTORNEY

April 15, 1958      L. J. BIRO      2,830,452
CLINICAL THERMOGRAPH
Filed July 13, 1953      2 Sheets-Sheet 2

INVENTOR,
LADISLAO JOSE BIRO

BY *Ivan P. Tashof,*
ATTORNEY

United States Patent Office 2,830,452
Patented Apr. 15, 1958

2,830,452
CLINICAL THERMOGRAPH
Ladislao José Biro, Buenos Aires, Argentina
Application July 13, 1953, Serial No. 367,618
3 Claims. (Cl. 73—340)

This invention relates to a thermosensitive device, and more particularly to a clinical thermograph.

The object of the invention is to provide a clinical thermograph which includes a novel mechanism for correcting or compensating for any variations in external temperature so that the instrument will give an accurate indication of the patient's temperature.

A further object of the invention is to provide a clinical thermograph which will correct for errors caused by a variation of the temperature within the housing or casing, the instrument of the present invention providing a thermal variation curve of the patient's temperature during a long period of time.

A further object of the invention is to provide a clinical thermograph which is extremely simple and inexpensive to manufacture.

Other objects and advantages will be apparent during the course of the following description.

In the accompanying drawings, forming a part of this application, and in which like numerals are used to designate like parts throughout the same:

Figure 1:
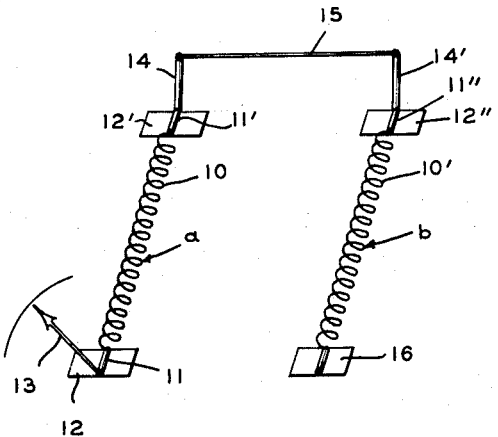
Figure 1 is a plan view illustrating the principle of the present invention.

Referring in detail to the drawings, and in particular to Figure 1 of the drawings, there is illustrated the principle upon which the present invention is based. Thus, in Figure 1 the letter $a$ designates a first thermosensitive element which may include a bi-metallic ribbon 10 that is shaped or wound as a spiral or helix, and one end of the helix 10 is connected to a small cylindrical rod 11 which is mounted in a bearing 12. An end of the rod 11 has secured thereto a pin or pointer 13 which is adapted to be used for indicating the variations of temperature on a suitable graduated chart as later described in this application or the pointer 13 can be used for inscribing the temperature variations on a moving band or ribbon.

The other end of the helix 10 is secured to a cylindrical rod 11' which is mounted in a bearing 12', and a bar 14 is secured to the rod 11'.

There is further provided a second thermosensitive element $b$ which includes a thin bimetallic ribbon wound or shaped to provide a helix 10', there being a rod 11'' connected to an end of the helix 10'. The rod 11'' is mounted is a bearing 12'' and a bar 14' is connected to the rod 11''. A rigid wire 15 interconnects the bars 14 and 14' so that any movement of the bar 14' is transmitted to the bar 14. The other end of the helix 10' can be rigidly secured to any suitable bearing 16 so as to prevent rotation of that end of the helix.

Figure 2:
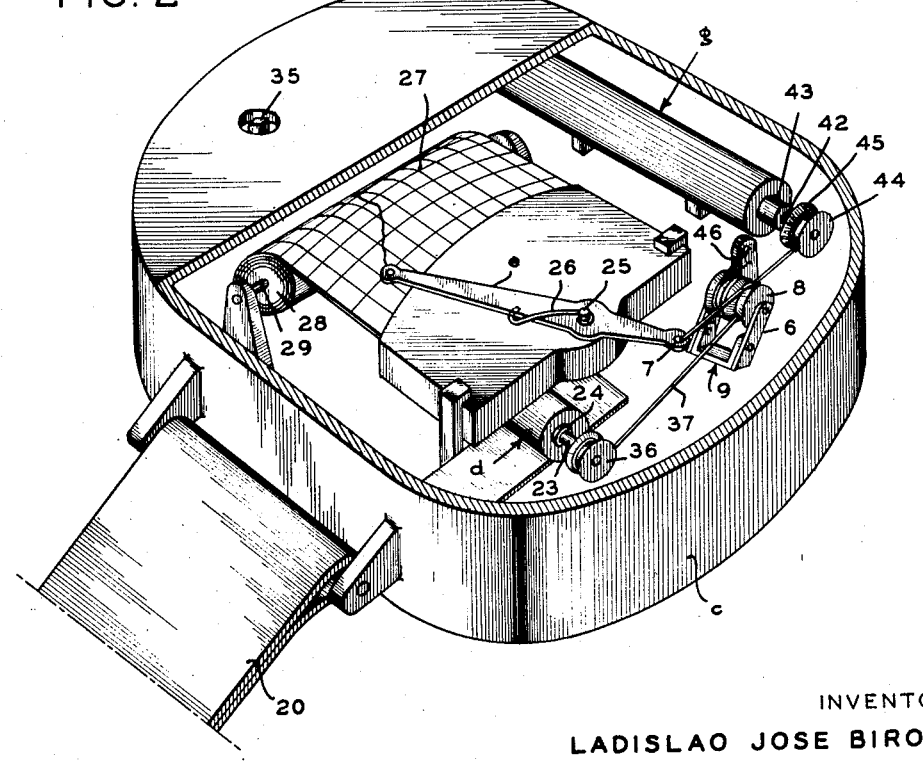
Figure 2 is a perspective view of the clinical thermograph, with parts broken away and in section.
Figure 3:
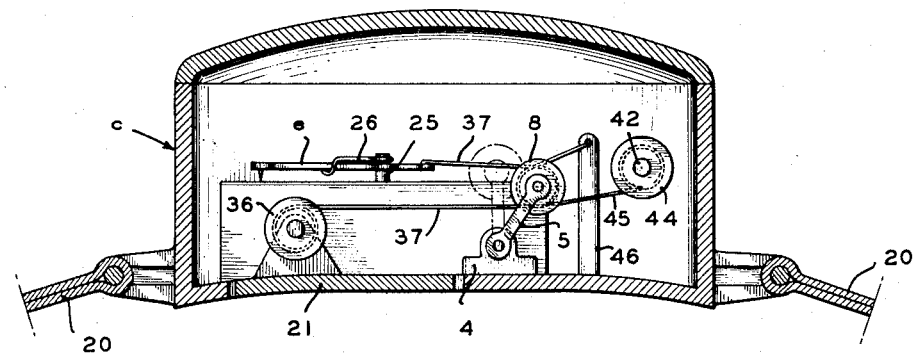
Figure 3 is a transverse sectional view taken through the instrument, and showing a modified guide mechanism.
Figure 4:
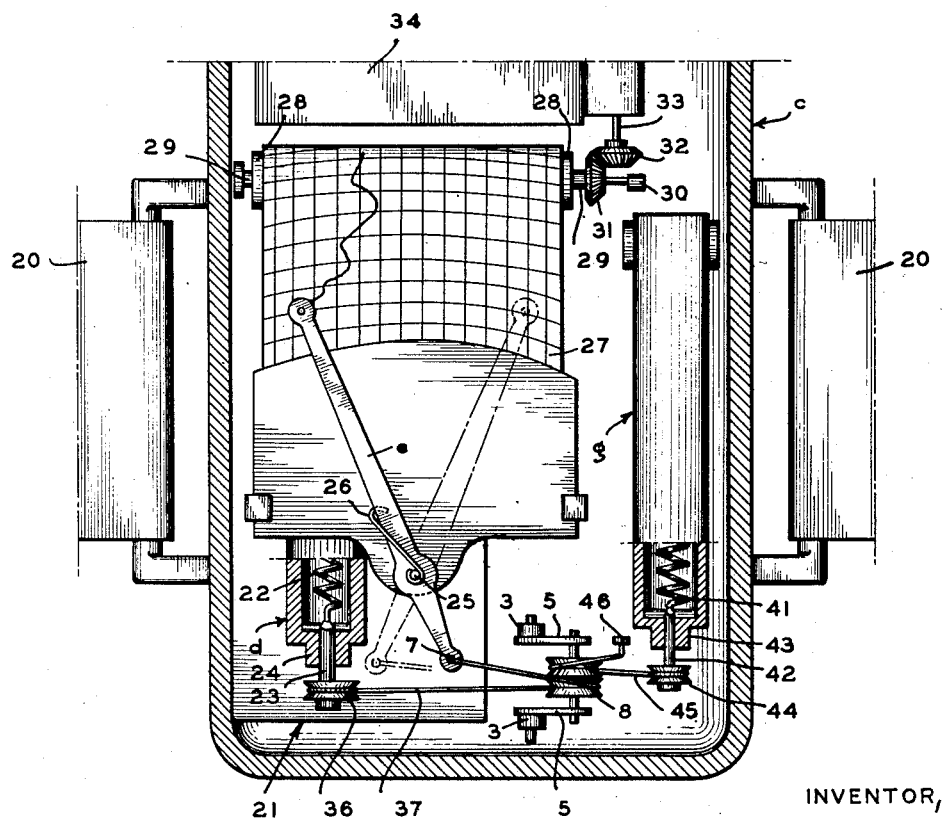
Figure 4 is a horizontal sectional view taken through the instrument and showing a further modification.

It will be seen that by constructing a cylinical thermograph so that the thermosensitive element $a$ is directly influenced by the temperature of the person to be examined or checked, and mounting the other thermosensitive element $b$ so that it is only influenced by the temperature fluctuations in the interior of a housing which encloses the entire mechanism, there will be provided a means for compensating for any errors of the primary thermosensitive element. In use, the variations of external temperature will be registered by the thermosensitive element $a$ to thereby move the pin 13 to different points on a suitable chart or the like. Any variation of temperature in the interior of the housing will also act on element $a$ and this would ordinarily make or cause erroneous markings. In order to avoid these errors, there has been provided the auxiliary thermosensitive element $b$ so that any variation of internal temperature in the housing will also act on the element $b$, the variations of the rod 14' will move opposite to or inversely with respect to the rod 14 which remains stationary due to the compensating or nullifying action of the rod or wire 15 which is operated or actuated by the member 14'. It is to be understood that the arrangement shown in Figure 1 is only schematic and the details of the invention are shown in Figures 2, 3 and 4.

The letter $c$ designates the casing or housing of the clinical thermograph which may be used for indicating or registering the temperature of a patient, and straps 20 may be provided for encircling the wrist or other part of the body where the invention is to be placed. A plate 21 is positioned in the lower part of the casing $c$ and the plate 21 is adapted to be arranged contiguous to or applied to the skin of a patient whereby the temperature of the patient will readily be transmitted through the plate. Arranged in thermal relationship with respect to the plate 21 is a conductor $d$ which is adapted to transmit heat from the plate 21 to a thermosensitive element 22 to thereby control the position of a pointer $e$ on the register. The thermosensitive element 22 includes a thin bimetallic ribbon which is wrapped as a helix and which rotates as the temperature of the patient changes. Extending from an end of the element 22 is an axle 23 which projects through a bearing 24. The pointer $e$ is pivotally mounted on a pin 25 and a spring 26 is arranged in engagement with the pointer $e$, the spring 26 serving to normally urge the pointer $e$ towards a position of maximum temperature indication on the thermogram 27.

The thermogram 27 may have its calibrated chart trained over or wound on a drum 28, and the drum 28 is mounted on an axle 29 which may be mounted in suitable bearings 30. A pinion gear 31 is mounted on the axle 29, and the pinion gear 31 meshes with a pinion gear 32 that is mounted on a shaft 33 which is actuated by a suitable clockwork mechanism 34. The clockwork mechanism 34 may be wound by means of a suitable key applied in the socket 35.

A pulley 36 is mounted on the axle 23 and a cable 37 is connected to the pulley 36, the cable 37 extending over a portion of a pulley 8 which is rotatably mounted by a bracket 6 that forms part of a movable guide member 9. The other end of the cable 37 is arranged in engagement with an opening 7 in the movable pointer $e$, Figure 2. The guide 9 is also subject to the movement of the auxiliary thermosensitive device $g$ whereby errors resulting from temperature fluctuations within the casing $c$ may be compensated for.

In the primary thermosensitive device the helix 22 tends to contract when the temperature descends so that the pulley 36 rotates and moves the cable 37 whereby the pointer $e$ will be urged towards a position of minimum reading on the clinical chart or thermogram 27. Conversely when the temperature is elevated, the thermosensitive device 22 rotates in the opposite direction to unwind the cable 37 and by means of the spring 26, the indicator e will be moved towards the position shown in broken lines in Figure 4 which is the position of maximum temperature on the thermogram.

The housing c tends to maintain as uniformly as possible the internal temperature of the device. However, it is impossible to prevent outside temperature influences from acting upon the internal mechanism so that ordinarily the reading on the thermogram 27 would be effected by the outside temperature. In order to avoid such errors, there is provided with the present instrument a correcting system which includes the secondary thermosensitive device g which is positioned within the housing by a suitable bearing. The thermosensitive device g includes a thermosensitive element 41 which is similar to the element 22 so that it is formed of a bimetallic helix which terminates in an axle 42. The axle 42 extends through a bearing 43 and a pulley 44 is mounted on the axle 43. A cable 45 is mounted on the pulley 44 and an end of the cable 45 may be secured to a pillar or anchor 46 which is mounted in the housing. Thus, the cable 45 acts in the opposite direction from the cable 37 to counteract or compensate for external temperature influences.

The thermosensitive element 41 is wound in such a manner that it rotates the pulley 44 to neutralize any errors that may be produced by the influence of temperature variations in the inner part of the housing and thereby insures that the pointer e will give a true reading.

For example, if the outside temperature surrounding the casing c is low, this temperature will effect the conductor d and will also effect the auxiliary thermosensitive device g so that the mobile bearing 9 will be moved to insure that only the temperature variations of the patient will be recorded on the thermograph. Thus, the instrument of the present invention will provide readings of the temperature of the patient with a very high degree of accuracy.

In use the instrument may be placed on the wrist of the patient or other part of the patient's body by means of the straps 20 and the body temperature will be transmitted through the plate 21 to actuate the thermosensitive element 22 to either wind or unwind this element. Thus, the cable 37 will be moved to displace the indicator e. This movement is dependent upon the position of the pulley 8 which is controlled by the cable 45 and pulley 44 and these parts respond to the internal temperature variations. Therefore, the indicator e will mark or otherwise provide on the thermogram 27 a continuous line which is the curve of the clinical chart. The chart of the thermogram may be continuously moved chronometrically by the clockwork mechanism 34.

The movable bearing shown in Figure 3 includes a pair of swinging arms 5 which support the guide pulley 8, and the lower ends of the arms 5 may be pivotally connected to bearing members 4.

In Figure 4 the movable guide includes arms 5 which support the pulley 8, and the arms 5 may be pivotally connected to bearing members 3 which are secured within the casing c.

From the foregoing it is apparent that a clinical thermograph has been provided which can be used for recording a patient's temperature over a long period of time and the device can be arranged next to the skin of the patient in order to register the temperature variations continuously. Also, the external temperature variations or fluctuations will no cause any errors in the reading or markings. By being able to strap the device on the wrist or other part of the body, the patient will not suffer any discomfort and can keep the device attached to his or her body for a long period of time.

I claim:

1. A clinical thermograph for indicating the temperature of a heated body comprising a housing, a conducting plate mounted in said housing for engagement with said heated body, a first bi-metallic thermosensitive element positioned in said housing in thermal association with said conducting plate, said first thermosensitive element being exposed to the temperature of the interior of the housing, a stylus, means for moving said stylus in response to the temperature of said first thermosensitive element, a second bi-metallic thermosensitive element in said housing, said second thermosensitive element and being exposed substantially only to the temperature of the interior of the housing in substantially the same manner as the first thermosensitive element is exposed to the temperature of the interior of the housing, and means for moving said stylus in response to the temperature of said second thermosensitive element, each of said respective means for moving said stylus being arranged to act on said stylus in opposite directions to compensate the motion of said stylus in accordance with the temperature in the interior of said housing, and a movable chart associated with said stylus.

2. A clinical thermograph as recited in claim 1, in which said thermosensitive elements are mechanically connected together, said mechanical connection comprising a movable guide including a rotatable pulley mounted thereon for movement transverse to the axis of the pulley, a first cable engaging said pulley and operatively connecting with said stylus and said first thermosensitive element, and a second cable operatively connected with said second thermosensitive element and engaging said guide for moving said pulley transversely to its axis.

3. A clinical thermograph as recited in claim 1, in which said stylus is pivotally mounted and spring-urged towards a position of maximum temperature indication and said thermosensitive elements and said stylus are mechanically connected by operatively connecting a first cable between said first thermosensitive element and said stylus, said first cable engaging one side of a movable guide and operatively connecting a second cable between said second thermosensitive element and said stylus, said second cable engaging said movable guide on the opposite side thereof.

References Cited in the file of this patent

UNITED STATES PATENTS

| 510,074 | Louis | Dec. 5, 1893 |
| 690,059 | Isham | Dec. 31, 1901 |
| 1,287,188 | Beck | Dec. 10, 1918 |
| 1,446,880 | Colby | Feb. 27, 1923 |
| 1,485,013 | Blakeslee | Feb. 26, 1924 |
| 2,635,468 | Field et al. | Apr. 21, 1953 |
| 2,701,964 | Argalrite | Feb. 15, 1955 |

FOREIGN PATENTS

| 93,524 | Germany | Aug. 24, 1897 |
| 352,313 | Germany | Apr. 24, 1922 |
| 847,451 | France | July 3, 1939 |
| 248,525 | Switzerland | May 15, 1947 |